United States Patent
Chiang et al.

(10) Patent No.: US 6,381,711 B1
(45) Date of Patent: Apr. 30, 2002

(54) METHOD AND APPARATUS FOR UNIFIED, PRE-ADDRESSED, CONTEXT-SENSITIVE REPORTING

(75) Inventors: Alice Chiang, Portola Valley; RamonaLisa P. Martinez, San Jose; Sheila I. Sholars, Hollister, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/175,841

(22) Filed: Oct. 20, 1998

(51) Int. Cl.[7] .................. G06F 11/00; G06F 11/36
(52) U.S. Cl. .................................. 714/48; 714/38
(58) Field of Search ............... 714/48, 38; 709/302, 709/219, 250; 707/102, 10, 1, 203; 717/1–3; 345/338; 703/22, 13; 702/123

(56) References Cited

U.S. PATENT DOCUMENTS

| | | | |
|---|---|---|---|
| 4,531,186 A | * | 7/1985 | Knapman |
| 4,809,170 A | * | 2/1989 | Leblang et al. |
| 4,918,723 A | | 4/1990 | Iggulden et al. |
| 5,103,498 A | | 4/1992 | Lanier et al. |
| 5,239,617 A | | 8/1993 | Gardner et al. |
| 5,297,150 A | * | 3/1994 | Clark |
| 5,390,281 A | | 2/1995 | Liciw et al. |
| 5,432,902 A | | 7/1995 | Matsumoto et al. |
| 5,477,447 A | | 12/1995 | Luciw et al. |
| 5,535,323 A | | 7/1996 | Miller et al. |
| 5,644,735 A | | 7/1997 | Luciw et al. |
| 5,870,746 A | * | 2/1999 | Knutson et al. |
| 6,133,917 A | * | 10/2000 | Feigner et al. |
| 6,169,543 B1 | * | 1/2001 | Wehmeyer |

OTHER PUBLICATIONS

"Silverlake Communications, Inc. Goes Online as the Company Introduces its Web Site", *Business Wire*, Dec. 2, 1996.
"From the Tip of the Taj Majal to the Base of Big Ben, Carmen Sandiego has been spotted in Broderbund's New Software Series and on Her Own Internet Site; Education Icon, Carmen Sandiego, Leaps into Her Second Decade as America's Mose Elusive Software Character", *Business Wire*, Aug. 26, 1996.
Haverson, Debra Sheer, "Stand Up And Be Heard. (Users Can Influence the Development of New or Enhanced Products)", *Midrange Systems*,, No. 12, vol. 7, Jun. 30, 1994. p47(2).

* cited by examiner

*Primary Examiner*—Gopal C. Ray
(74) *Attorney, Agent, or Firm*—Gates & Cooper LLP

(57) ABSTRACT

A method, apparatus, and article of manufacture for reporting a context-sensitive comment to a pre-addressed destination is described. The method comprises the steps of invoking a help module from a software application, invoking a reporting module from the help module or directly from the software application, reading software application context information from the software application, presenting a user dialog based on the software application context information, accepting a comment in an input field in the user dialog, and transmitting the user report to a destination. The article of manufacture comprises a data storage device tangibly embodying instructions to perform the method steps described above. The apparatus comprises a reporting module for reading the software application context information and for presenting a user dialog with an input box for user comments, and a device for transmitting the user report to a destination.

65 Claims, 5 Drawing Sheets

METHOD AND APPARATUS FOR UNIFIED, PRE-ADDRESSED, CONTEXT-SENSITIVE REPORTING

BACKGROUND OF THE INVENTION

1. Field of the Invention

The present invention relates to systems and methods for communicating customer comments to product vendors, and in particular to a method and system for reporting context-sensitive comments regarding software applications to software developers.

2. Description of the Related Art

Only a few decades ago, software applications were largely special-purpose products whose primary users included only a relatively small number of highly trained personnel. Since that time however, the number of software applications and software users has increased dramatically. There has also been an explosion in the rate at which new applications are introduced into the marketplace. Many of these new applications are general purpose applications that appeal to a large number of users, but an even greater number are special purpose applications from smaller software developers that are aimed primarily at specialized user groups.

For software developers, there are two keys to success in the marketplace: the ability to generate a product that meets the user's needs, and the ability to develop and market that product before its competitors. Advances in software programming techniques, such as the advent and widespread use of object-oriented programming, have made it considerably easier for programmers to quickly develop and debug software applications. They have also made it easier to introduce new versions of software products with additional features and functionality.

However, these techniques are of little use if the resulting product does not meet the software end-user's needs, and precisely defining and/or predicting end-user's needs is not a simple task. One reason for this problem is that user needs develop and change as quickly as the software products themselves. For example, the introduction of a new drawing application may raise the need for backwards compatibility with an existing product from a competing software vendor, or may illustrate a feature that should be integrated into existing products as well.

Another reason is that it is difficult for users to define precisely what they want in a product, and it is usually left to market research personnel to make that determination. Market research is not inexpensive. Further, even if the user's comments actually get to the development team, those comments have been filtered (often by those who do not understand the software development process or the product itself), watered down, or distorted to the point where the comments are no longer valid or utterly useless. Yet another reason is that software users are typically busy doing their jobs, and are uninterested in taking more than a moment of their personal time to suggest changes or improvements. Even a small hurdle between the users and the software development team is sufficient to prevent a significant number of useful comments from being submitted. Further, any difficulty in submitting such comments inherently distorts the aggregated information provided by the user group's feedback. That is because comments are no longer reflective of the typical user's opinions, they instead reflect the opinions and suggestions from users with a lot of time, a strong propensity to submit comments, or those with problems serious enough to bother to contact the development team.

From the foregoing, it is apparent that there is a need for a consistent way for users to rapidly and easily submit comments regarding a software application to the software developers, and for a way for the software developers to process that information and deliver it to the software development team. The present invention satisfies that need.

SUMMARY OF THE INVENTION

To address the requirements described above, the present invention discloses a method, apparatus, and article of manufacture for reporting a context-sensitive comment to a pre-addressed destination.

The method comprises the steps of invoking a help module from a software application, invoking a reporting module from the help module, reading software application context information from the software application, presenting a user dialog based on the software application context information, accepting a comment in an input field in the user dialog, and transmitting the user report to a destination. The article of manufacture comprises a data storage device tangibly embodying instructions to perform the method steps described above.

The apparatus comprises a reporting module for reading the software application context information and for presenting a user dialog with an input box for user comments, and a means, such as a modem, networking system or similar devices for transmitting the user report to a destination.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
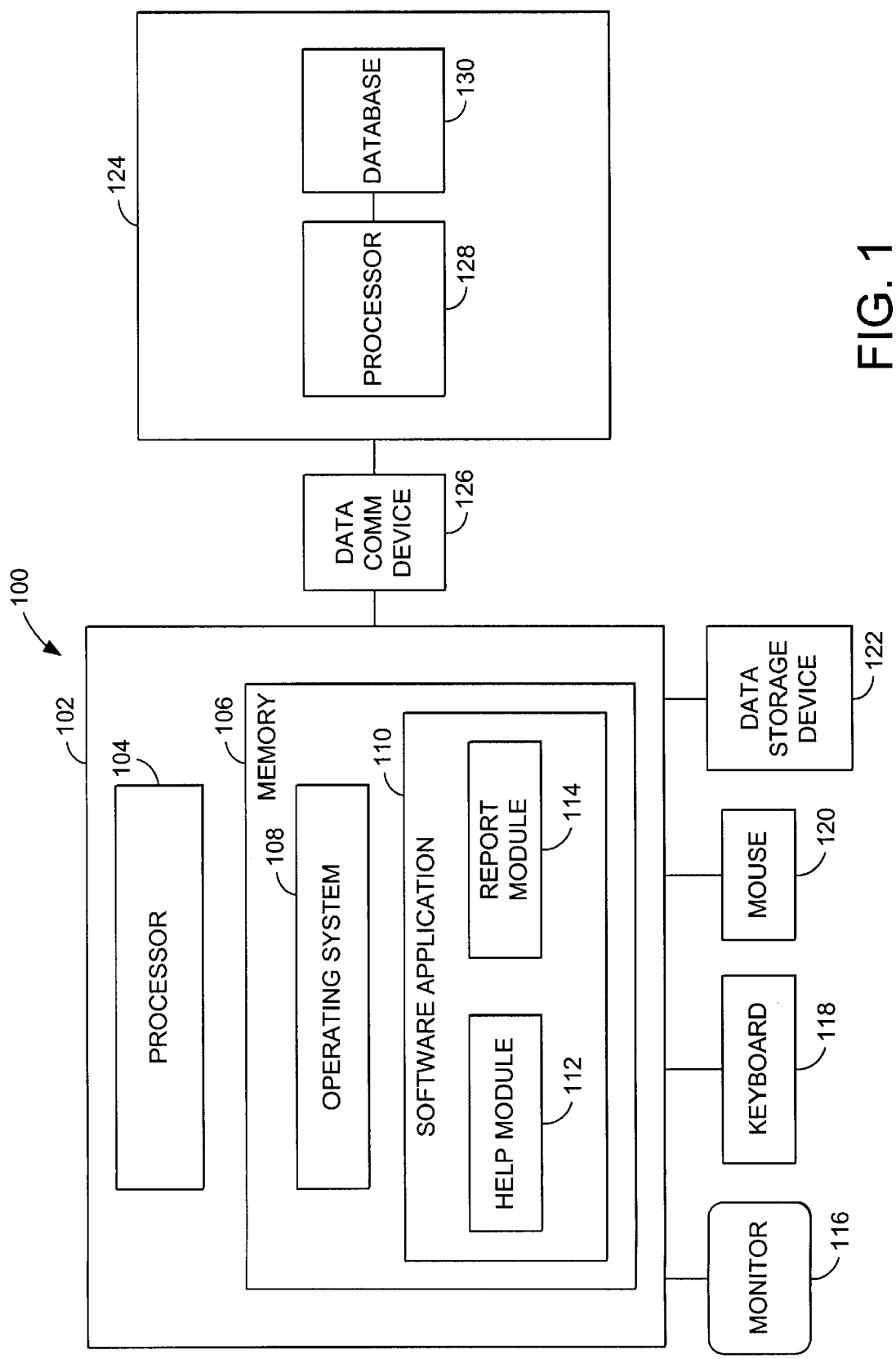
FIG. 1 is a block diagram showing an exemplary hardware environment for practicing the present invention.

FIG. 1 is a block diagram showing a hardware environment 100 implementing one embodiment of the present invention. The hardware environment includes a computer 102 having a processor 104 and a memory 106. Instructions are stored in the memory 106, which implement an operating system 108, and one or more computer programs 110. Software application 110 comprises a help module 112 that can be invoked by the user for assistance in operating the software application 110. The help module. 112 presents a help window that can be invoked manually by the user when help is desired, or may be invoked when the inputs provided by the user to the computer 102 indicate that help would be beneficial. In one embodiment, the help module comprises a help wizard having a help tree. The help tree comprises a series of questions and/or statements that a user can select to describe the problem encountered. Depending on the input provided by the user, the help window is changed to represent the further options and troubleshooting questions and/or statements. A series of such questions, statements, or instructions represents a branch in a help tree.

The software application 110 also comprises a report module 114, which implement the reporting functions and features. Report module 114 is typically invoked via a hotkey button from the keyboard 118, but can be invoked by the software application 110, or the help module 112 as well.

Data storage device 122 tangibly embodies program steps to perform processor instructions. The program storage device can include a CD-ROM, read/writeable CD-ROM, floppy disk, tape drive, magneto-optical storage apparatus, or similar device.

Generally, the software application 110 and/or operating system 108 are tangibly embodied in a computer-readable device or media, such as memory 106, data storage devices 122, and/or data communications devices 126, thereby making a computer program product or article of manufacture according to the invention. As such, the terms "article of manufacture" and "computer program product" as used herein are intended to encompass a computer program accessible from any computer readable device or media.

Moreover, the software applications 110 and operating system 108 are comprised of instructions which, when read and executed by the computer 102, cause the computer 102 to perform the steps necessary to implement and/or use the present invention. Under control of the operating system 108, the computer programs may be loaded from memory 106, data storage devices 122, and/or data communications devices 126 into the memory 106 of the computer 102 for use during actual operations.

Many modifications may be made to this configuration without departing from the scope of the present invention, and any combination of the above components, or any number of different components, peripherals, and other devices, may be used with the present invention. For example, although the help module 112 and report module 114 are shown as separate modules for illustrative purposes, the present invention may be practiced with the report module 114 as a part of the help module 112, or with both the report 114 and help 112 modules being separate from the software application 110.

Computer 102 is operatively coupled to a monitor 116 for displaying information generated by the computer 102, a keyboard 118 for providing alphanumeric and cursor control input, a mouse 120, and a data storage device 122. The computer 102 may also be coupled to a destination 124 via the data communication device 126. The destination 124 includes a database 130 communicatively coupled to a destination processor 128 for accepting the data from the data communications device 126, processing the data received from the computer 102, and for returning acknowledgement messages to the computer 102.

Process

Figure 2:
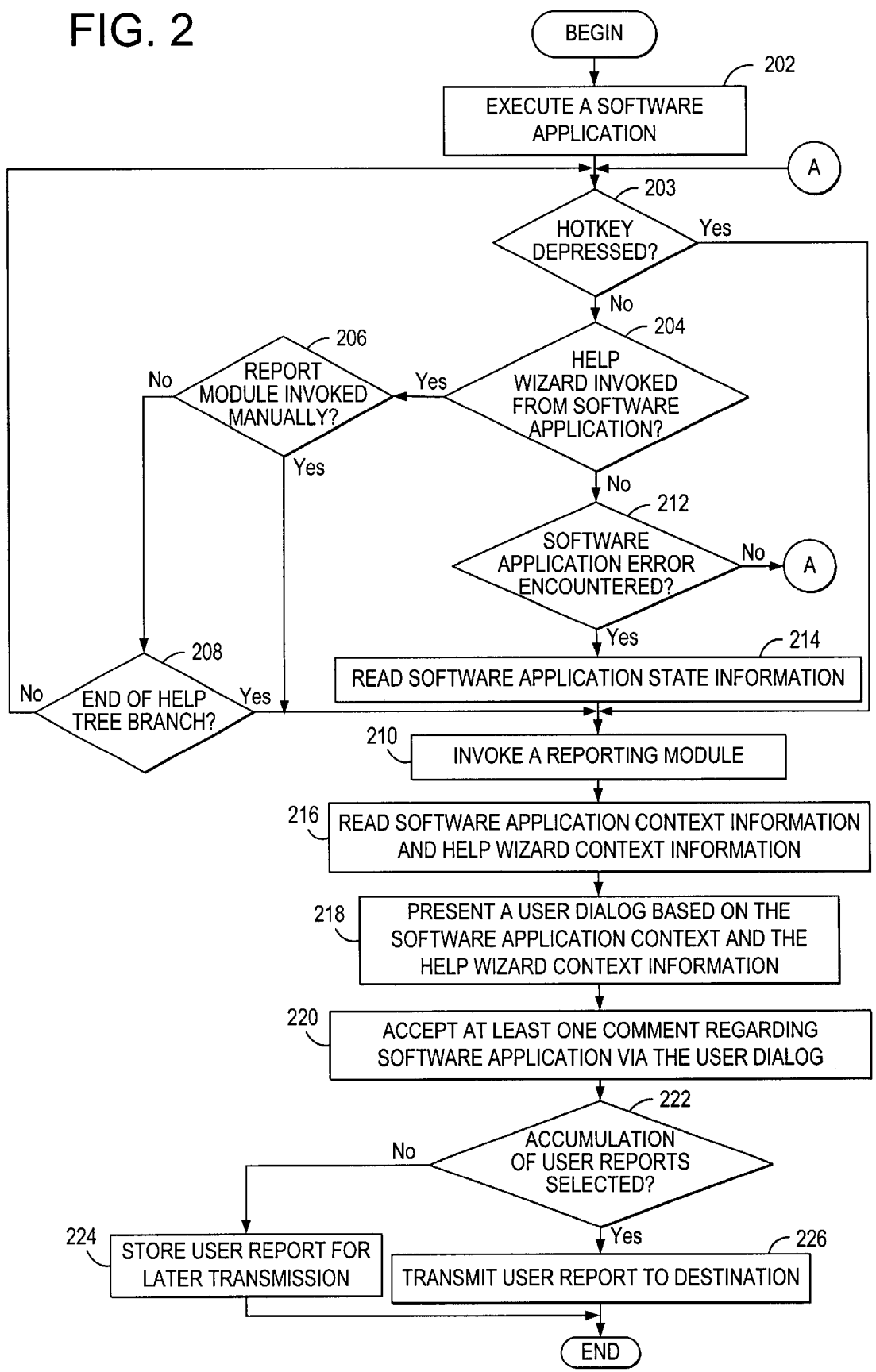
FIG. 2 is a flow chart presenting an illustrative example of process steps used in reporting context-sensitive comments to a destination.

FIG. 2 is a flow chart showing the operations used to practice one embodiment of the present invention. The process begins by executing a software application 110 in the computer 102. This is shown in block 202. The report module 114 can be invoked in several ways. As shown in block 203, the report module 114 is ordinarily user-initiated. That is, it can be invoked by depressing a "hotkey" on the keyboard 118. In one embodiment, an inter-application consistent "hotkey" is used. This assures that the report module 114 is invoked in substantially the same way in all applications that may operate on the computer 102. This "hotkey" implementation further increases the likelihood that the user will use the report module to submit suggestions.

The report module 114 can also be invoked through the help module 112, by manual selection of a button in a help window displayed on the monitor 116, or after the branches of a help tree are exhausted. This is depicted in blocks 204–208. The report module 114 can also be invoked when a software application error is encountered, as shown in block 212. In such cases, software application state information is read 214 from the appropriate memory registers in the computer 102 used by the software application 110. This state information includes sufficient data to enable the destination to determine the source of the error and to troubleshoot the application. For example, the state information may include the instruction that caused the error, and the address of variables used in that instruction. Data indicating the context of the software application 110 may also be included. A context history of the application, which represents sufficient data to determine not only the present state of the application, but past states of the application may also be included.

Next, as shown in block 210, the report module 114 is invoked. Information is then compiled, and the user is presented 218 with a dialog based upon the information. The information compiled may include the software application context information, context history information, more detailed application state information, and help wizard 112 information, alone, or in any combination thereof. If no information is available or required, a standard user dialog is presented to the user for input. Since the report module has sufficient information (such as an e-mail address or facsimile telephone number) to determine where the user report should be sent the user report is pre-addressed.

In one embodiment, the reporting module is implemented by one or more application program interface (API) modules. These API modules can be used by the software developer to tailor the reporting module's 114 interfaces, protocol, and functions to specific developer needs. For example, many software developers use problem reporting tools for problem reporting, configuration management and version control of software. These tools are also typically operatively coupled to databases. Using the API modules, the software developer can tailor the reporting module 114 to prompt the user to enter comments in a form that can be directly entered into the database without further processing. This may comprise a single dialog box in a graphical user interface (GUI), or a series of such dialog boxes. This relieves the developer of the task of processing the user comments to place them into a form that is usable by the database.

Figure 3:
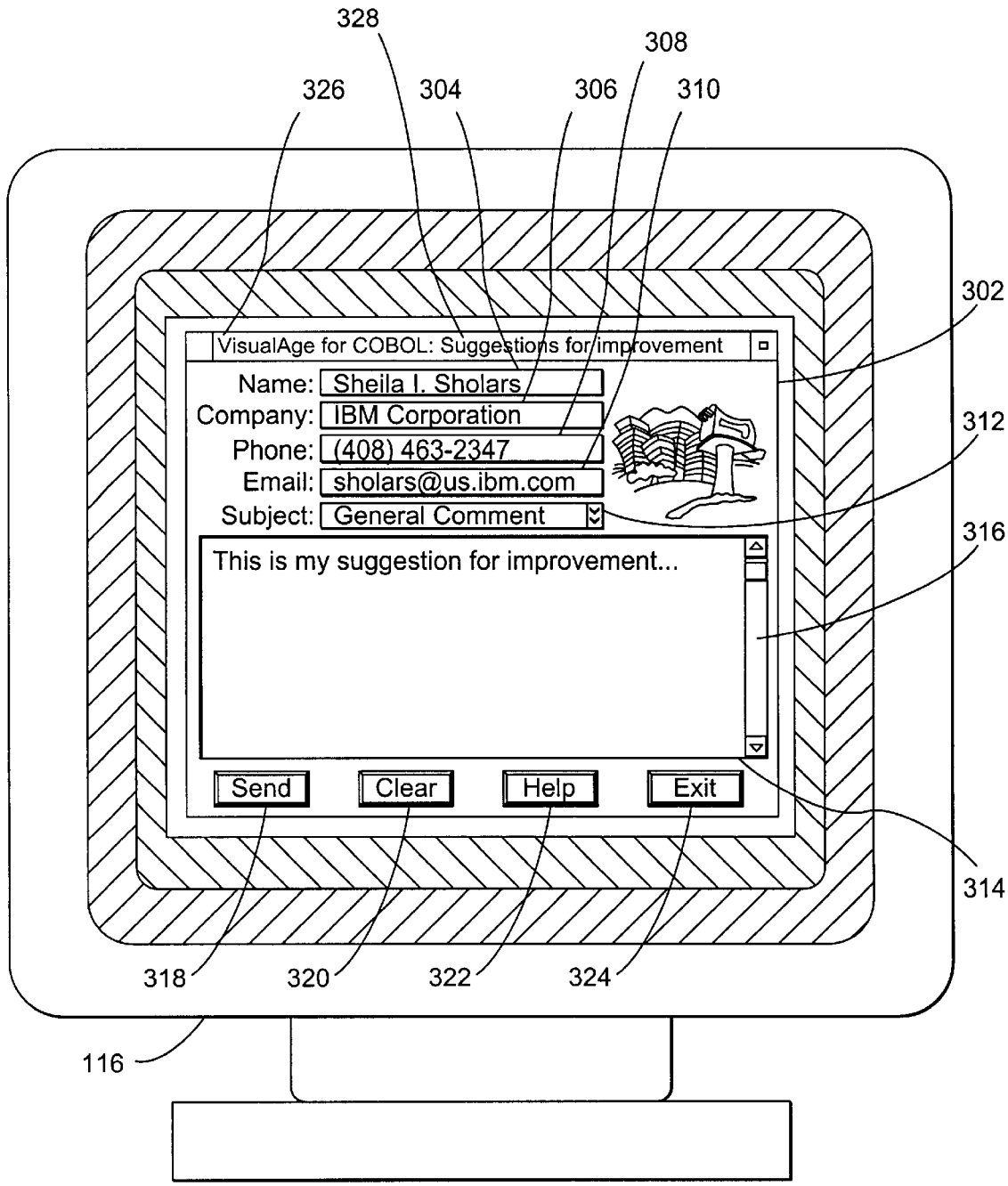
FIG. 3 is a diagram presenting an illustrative example of a user interface.

FIG. 3 is a diagram showing one embodiment of the user dialog. In the illustrated embodiment, the user dialog is represented by a user dialog window 302. The window includes a title header with an annotation 326 indicating the software application 110 through which the report module 114 was invoked. Second annotation 328 provides further information to tell the user that the user dialog window 302 is for reporting suggestions or problems to the software developer.

Figure 4:
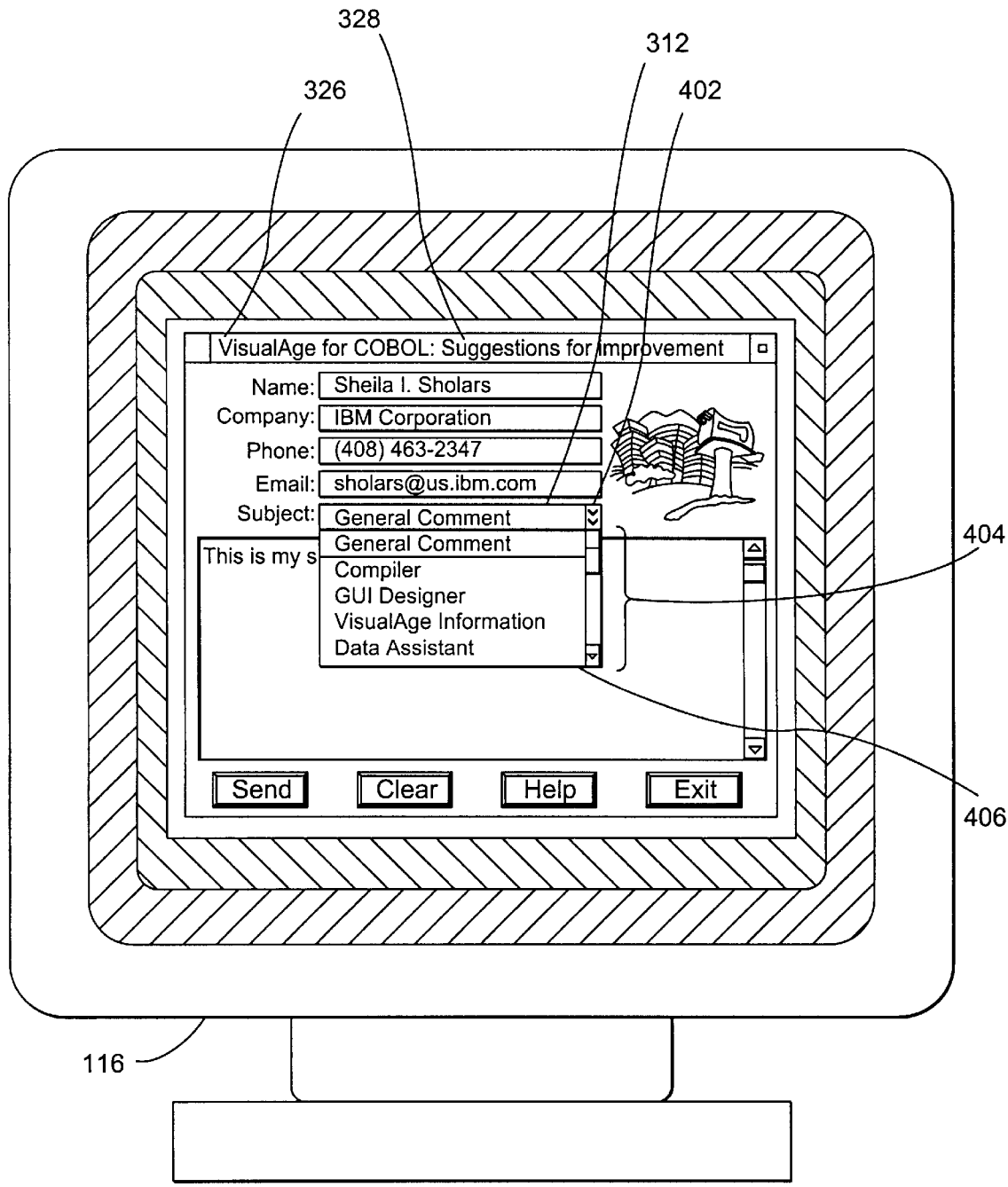
FIG. 4 is a diagram presenting an illustrative example of a subject input box.

User dialog window 302 includes a name input box 304 for accepting 220 the name of the person submitting the report, a company input box 306 for accepting data indicating the organization that the person submitting the report is affiliated with. Similarly, telephone number input box 308 allows the user to enter a telephone number so the software developer can contact the submitter personally, if necessary. Daytime and nighttime telephone numbers may be added separately, if desired. E-mail address input box 310 allows the user to enter the appropriate email address for a response or acknowledgement message from the destination. Subject input box 312 allows the user to enter the subject of the comment, or to select from a number of available alternatives. FIG. 4 is a diagram showing one embodiment of the subject input box 312. When the subject box tab 402 is depressed, a drop down list of alternatives 404 is presented to the user. Scroll bar 406 is used to view elements of the drop down list, if necessary. The available alternatives can be determined from a global list of all possible alternatives, or can include available alternatives based upon the software application context, the history of the software application context, the software application state, or the help module context. For example, if the user entered the dialog 302 after passing through a branch in a help tree from the help module 112, the context of the help module can be used to disable or remove inapplicable subject selections. This may occur, for example, if the user attempted to print a document, and was unsuccessful in doing so. Since the user has presumably passed through the help tree branches applicable to the desired printing operation the help module context or its history can be used to remove subjects unrelated to printing from the subject input box 312. Unrelated subjects may also be disabled, yet still displayed in gray. Subjects may also be presented in order of predicted pertinence, again using the context or application state information.

The user dialog window 302 also comprises a free-form input field or box 314, which can be used to enter suggestions in ordinary conversational language. Scroll bar 316 allows messages of any length to be entered and reviewed. Alternatively or in combination, a series of radio buttons or a drop down box can be provided to provide the user with a list of choices from which to select additional suggestion categorizations (i.e. "performance improvement suggestion," or "usability suggestion"). These suggestion categorizations can be used by the destination 124 to process and route the suggestions when received.

In another embodiment of the present invention, the suggestion categorizations, help module 112 context, software application 110 context, or other data is used to set up and/or initiate the transport session with the destination 124. This feature is particularly useful when the proper destination 124 for a particular comment depends on the comment itself, its categorization, or context factors. For example, if the suggestion categorization involves the graphical user interface (GUI), the transport session can be initiated directly with the department responsible for GUI design or implementation.

Clear button 320 clears the entries in the active box. Help button 322 invokes a report module help box, which guides the user through the process of submitting suggestions using the foregoing. The suggestions presented by the guide may be simple, or in the form of a wizard. When the user has completed the suggestion, the send button 318 is depressed. If the user would prefer to leave the report module without submitting a comment, the exit button 324 is depressed.

Referring back to FIG. 2, the present invention allows the user to immediately initiate a transport connection to transmit the user report to the destination 124, or to store user reports for later transmission. This capability is illustrated in blocks 222–226. This feature reduces communication connect time between the user computer 102 and the destination 124, and allows the user to manage user reports. In addition, user reports that have been stored can be deleted or altered before transmission.

In one embodiment of the present invention, a transport session is initiated when the report module is invoked. This feature allows the dialup operations (and other overhead) to be completed while the user formulates the user comments and is inputting information into the user dialog 302. This technique also allows the dial-up operations and other higher order interrupt operations to be completed at a time when processing overhead is usually low.

Figure 5:
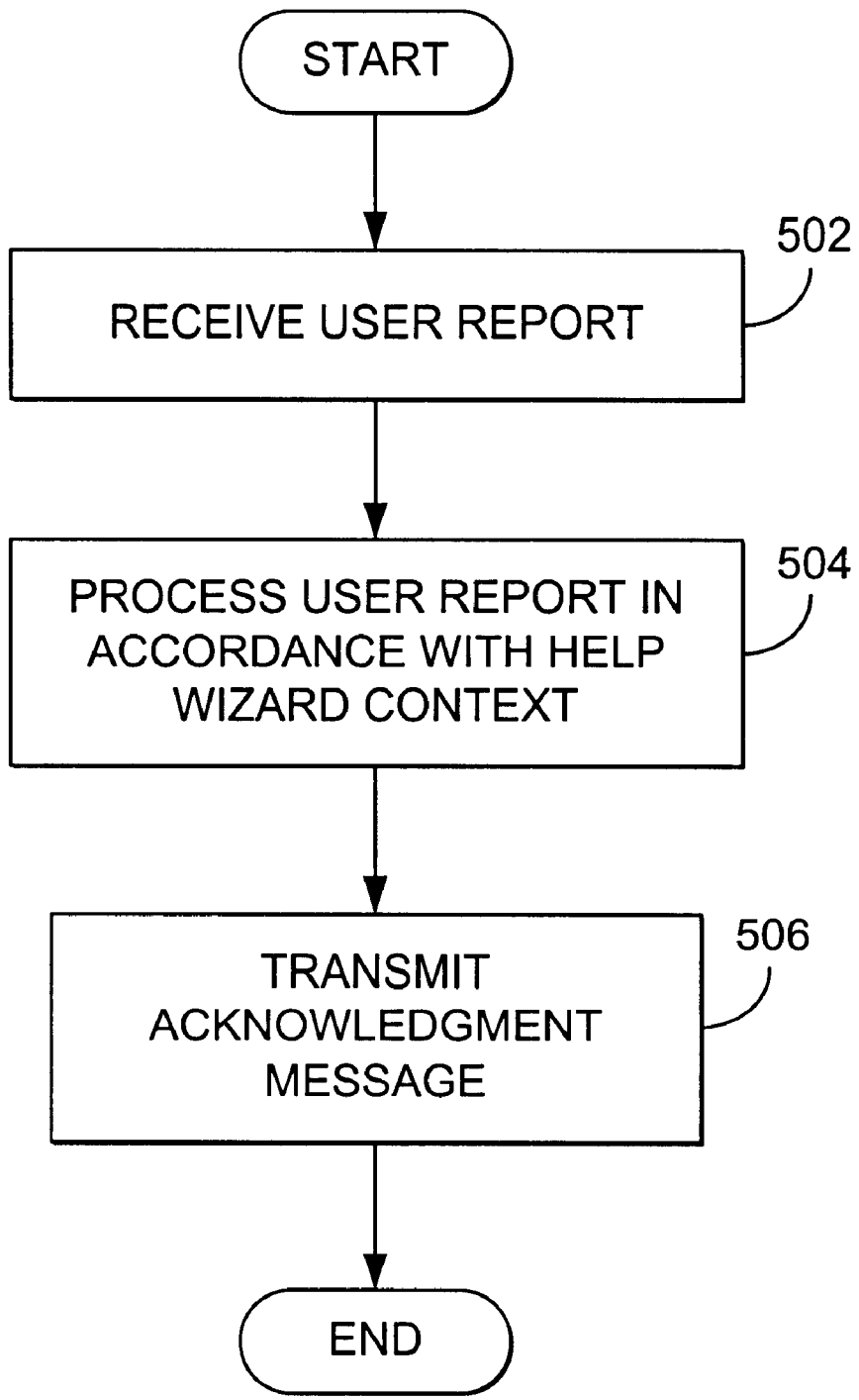
FIG. 5 is a flow chart presenting an illustrative example of process steps used in receiving and processing the context sensitive comments at the destination.

FIG. 5 is a flow chart depicting an illustrative example of the process steps performed in receiving and processing the user comments at the destination 124. First, the user report is received 502 via the data communication device 126. Then, the user report is processed by the destination processor 128 in accordance with the help module context. This is depicted in block 504. This can include routing the user report to the entity at or in communication with the destination 124 that has been designated to respond to the received comment. The user report can also be processed in accordance with the software application 110 context, software application 110 state, the suggestion categorization, or the user comment itself. Finally, if desired, the destination 124 can transmit 506 an acknowledgement message to the submitting user, indicating that the user comment was received. The acknowledgement message can also include information relating to the action to be taken by the destination 124. Further, the acknowledgement message can include information prompting the user to enter more information regarding the comment that was just submitted. This may occur, for example if the user comment was particularly insightful, or if some amount of requisite information was missing from the user report that is necessary for further processing.

The present invention can also implement more complex user report processing schemes. For example, destination processor 128 may be communicatively coupled to database 130, which is used to manage user report data. Statistical data regarding the frequency of user comments or complaints, the source of most comments/complaints, or other such data can be created and maintained using the destination processor 128 and the database 130. This data can be used to prioritize and manage the user comments, or can be used to maintain a repository of user data. For example, if a user has submitted a trouble report indicating that the software application is not operational, a help technician at the destination or other location can recall the information in the database, and see the user report history for that particular user.

Conclusion

This concludes the description of the preferred embodiments of the present invention. In summary, the present invention describes a method, apparatus, and article of manufacture for reporting a context-sensitive comment to a pre-addressed destination.

The method comprises the steps of invoking a help module from a software application, invoking a reporting module from the help module or directly from the software application, reading software application context information from the software application, presenting a user dialog based on the software application context information, accepting a comment in an input field in the user dialog, and transmitting the user report to a destination. The article of manufacture comprises a data storage device tangibly embodying instructions to perform the method steps described above.

The apparatus comprises a reporting module for reading the software application context information and for presenting a user dialog with an input box for user comments, and a means, such as a modem, networking system or similar device for transmitting a user report with the context and user report information to a destination.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method of reporting context-sensitive information to a pre-addressed destination, comprising the steps of:

invoking a help module from a software application;

invoking a reporting module from the help module;

reading software application context information from the software application and help module context information from the help module;

presenting a user dialog based on the software application context information and the help module context information, the user dialog comprising an input field;

accepting user-input information regarding the software application via the user dialog; and transiting a user report comprising the information, the software application context information, and the help module context information to the pre-addressed destination.

2. The method of claim 1, wherein the help module comprises a tree of help instructions, and the reporting module is invoked when a branch of the tree of help instructions is exhausted.

3. The method of claim 1, wherein a transport connection is initiated with the destination when the reporting module is invoked, the user report is transmitted to the destination via the transport connection.

4. The method of claim 1, further comprising the steps of:

accumulating the user reports for multiple invocations of the reporting module in a computer executing the software application; and establishing a transport connection with the destination after the software application is closed.

5. The method of claim 1, further comprising the steps of:

accumulating the user reports for multiple invocations of the reporting module in a computer executing the software application module; and establishing a transport connection with the destination when a number of user reports exceeds a threshold value.

6. The method of claim 1, further comprising the step of:

receiving the user report at the pre-determined destination; and processing the user report in accordance with the user comment and the help module context information.

7. The method of claim 6, wherein the user report is routed according to the report information.

8. The method of claim 6, wherein the step of processing the user report in accordance with the help module context information comprises the step of storing the user report information in a database and the method further comprises the step of generating statistics from the database.

9. The method of claim 8, wherein the user report is transmitted from a user address and the method further comprises the step of transmitting an acknowledgement message from the destination to the user address.

10. A computer-implemented method of reporting a software application error to a pre-addressed destination, comprising the steps of:

executing a software application;

invoking a reporting module when the software application encounters an error;

reading software application state information comprising error and system information;

presenting a user dialog based on the software application state information, the user dialog comprising at least one input field;

accepting comments regarding the software application via the user dialog; and transmitting a user report comprising the comments and the application state information to the pre-addressed destination.

11. The method of claim 10, wherein:

a transport connection is initiated with the destination when the reporting module is invoked; and the user input and the application state information is transmitted to the destination via the transport connection.

12. The method of claim 11, further comprising the step of:

receiving the user report at the pre-determined destination; and processing the user report in accordance with the user comments and the application state information.

13. The method of claim 12, wherein the user report is routed according to the user comments and application state information.

14. The method of claim 12, wherein the step of processing the user report in accordance with the user comments and application state information comprises the step of storing the user report information in a database and the method further comprises the step of compiling statistics from the database.

15. The method of claim 10, wherein the user report is transmitted from a user address and the method further comprises the step of transmitting an acknowledgement message from the destination to the user address.

16. A computer-implemented method of receiving context-sensitive comments in a pre-addressed destination, comprising the steps of:

receiving a user report at the pre-addressed destination, the user report comprising application context information and user comments generated via a reporting module; and processing the user report based on the user comments and context information.

17. The method of claim 16, wherein the step of processing the user report based on the user comments comprises the step of routing the user report according to the user comments and context information.

18. The method of claim 16, wherein the step of processing the user report based on the user comments comprises the step of performing a statistical analysis of the user reports.

19. A computer-implemented method of reporting comments to a destination, comprising the steps of:
invoking a module in a software application;
accepting comments in an input field of a user dialog, the user dialog based upon a current context of the software application; and
transmitting a user report comprising the contents and the current context to the destination.

20. The method of claim 19, wherein the user report further comprises the context history of the software application.

21. A computer-implemented method of reporting context-sensitive comments to a pre-addressed destination from an executing software application, comprising the steps of:
invoking a reporting module in the executing software application;
reading software application context information from the executing software application;
presenting a user dialog based on the software application context information, the user dialog comprising an input field;
accepting the comments via the user dialog; and
transmitting a user report comprising the comments and the context information to the pre-addressed destination.

22. An apparatus for reporting context-sensitive information to a pre-addressed destination, comprising:
means for invoking a help module from a software application;
means for invoking a reporting module from the help module;
a reporting module for reading software application context information from the software application and help module context information from the help module, for presenting a user dialog based on the software application context information and the help module context information, the user dialog comprising an input field, and for accepting information regarding the software application via the user dialog; and
means for transmitting a user report comprising the comment, the software application context information, and the help module context information to the pre-addressed destination.

23. The apparatus of claim 22, wherein the report module is tailorable by a set of software developer-configurable software application program interface modules.

24. The apparatus of claim 22, wherein the help module comprises a tree of help instructions, and the reporting module is invoked when a branch of the tree of help instructions is exhausted.

25. The apparatus of claim 22, wherein a transport connection is initiated with the destination when the reporting module is invoked, the user report is transmitted to the destination via the transport connection.

26. The apparatus of claim 22, further comprising:
means for accumulating the user reports for multiple invocations of the reporting module in a computer executing the software application; and
means for establishing a transport connection with the destination after the software application is closed.

27. The apparatus of claim 22, further comprising:
means for accumulating the user reports for multiple invocations of the reporting module in a computer executing the software application module; and
means for establishing a transport connection with the destination when a number of user reports exceeds a threshold value.

28. The apparatus of claim 22, further comprising:
means for receiving the user report at the pre-determined destination; and
means for processing the user report in accordance with the user comment and the help module context information.

29. The apparatus of claim 28, wherein the user report is routed according to the user report information.

30. The apparatus of claim 28, wherein the means for processing the user report in accordance with the help module context information comprises means for storing the user report information in a database and the apparatus further comprises means for generating statistics from the database.

31. The apparatus of claim 30, wherein the user report is transmitted from a user address and the apparatus further comprises means for transmitting an acknowledgement message from the destination to the user address.

32. An apparatus for reporting a software application error to a pre-addressed destination, comprising:
means for executing a software application;
means for invoking a reporting module when the software application encounters an error;
means for reading software application state information comprising error and system information;
means for presenting a user dialog based on the software application state information, the user dialog comprising at least one input field;
means for accepting comments regarding the software application via the user dialog; and
means for transmitting a user report comprising the comments and the application state information to the pre-addressed destination.

33. The apparatus of claim 32, further comprising:
means for initiating a transport connection with the destination when the reporting module is invoked; and
means for transmitting the user input and the application state information via the transport connection.

34. The apparatus of claim 33, further comprising:
means for receiving the user report at the pre-determined destination; and
means for processing the user report in accordance with the user comments and the application state information.

35. The apparatus of claim 34, wherein the user report is routed according to the user comments and application state information.

36. The apparatus of claim 34, wherein the means for processing the user report in accordance with the user comments and application state information comprises means for storing the user report information in a database and the apparatus further comprises means for compiling statistics from the database.

37. The apparatus of claim 32, wherein the user report is transmitted from a user address and the apparatus further comprises means for transmitting an acknowledgement message from the destination to the user address.

38. An apparatus for receiving context-sensitive comments in a pre-addressed destination, comprising:
  means for receiving a user report at the pre-addressed destination, the user report comprising application context information and user comments generated via a reporting module; and
  a processor communicatively coupled to a database, for processing the user report based on the user comments and context information.

39. The apparatus of claim 38, wherein the means for processing the user report based on the user comments comprises means for routing the user report according to the user comments and context information.

40. The apparatus of claim 38, wherein the means for processing the user report based on the user comments comprises means for performing a statistical analysis of the user reports.

41. An apparatus for reporting comments to a destination, comprising:
  means for invoking a module in a software application;
  means for accepting comments in an input field of a user dialog, the user dialog based upon a current context of the software application; and
  means for transmitting a user report comprising the comments and the current context to the destination.

42. The apparatus of claim 41, wherein the user report further comprises the context history of the software application.

43. An apparatus for reporting context-sensitive comments to a pre-addressed destination from an executing software application, comprising:
  a reporting module invoked from the executing software application;
  means for reading software application context information from the executing software application;
  a user dialog based on the software application context information, the user dialog comprising an input field;
  a user interface for accepting the comments via the user dialog; and
  means for transmitting a user report comprising the comments and the context information to the pre-addressed destination.

44. A program storage device, readable by computer having a processor and a memory, tangibly embodying one or more programs of instructions executable by the computer to perform the method steps of reporting context-sensitive information to a pre-addressed destination, the method steps comprising the steps of:
  invoking a help module from a software application;
  invoking a reporting module from the help module;
  reading software application context information from the software application and help module context information from the help module;
  presenting a user dialog based on the software application context information and the help module context information, the user dialog comprising an input field;
  accepting user-input information regarding the software application via the user dialog; and
  transmitting a user report comprising the comment, the software application context information, and the help module context information to the pre-addressed destination.

45. The program storage device of claim 44, wherein the help module comprises a tree of help instructions, and the reporting module is invoked when a branch of the tree of help instructions is exhausted.

46. The program storage device of claim 44, wherein a transport connection is initiated with the destination when the reporting module is invoked, the user report is transmitted to the destination via the transport connection.

47. The program storage device of claim 44, wherein the method steps further comprise the steps of:
  accumulating the user reports for multiple invocations of the reporting module in a computer executing the software application; and
  establishing a transport connection with the destination after the software application is closed.

48. The program storage device of claim 44, wherein the method steps further comprise the steps of:
  accumulating the user reports for multiple invocations of the reporting module in a computer executing the software application module; and
  establishing a transport connection with the destination when a number of user reports exceeds a threshold value.

49. The program storage device of claim 44, wherein the method steps further comprise the steps of:
  receiving the user report at the pre-determined destination; and
  processing the user report in accordance with the user comment and the help module context information.

50. The program storage device of claim 49, wherein the user report is routed according to the user report information.

51. The program storage device of claim 49, wherein the method step of processing the user report in accordance with the help module context information comprises the method step of storing the user report information in a database and the method steps further comprises the step of generating statistics from the database.

52. The program storage device of claim 51, wherein the user report is transmitted from a user address and the method steps further comprise the step of transmitting an acknowledgement message from the destination to the user address.

53. A program storage device, readable by computer having a processor and a memory, tangibly embodying one or more programs of instructions executable by the computer to perform the method steps of reporting a software application error to a pre-addressed destination, the method steps comprising the steps of:
  executing a software application;
  invoking a reporting module when the software application encounters an error;
  reading software application state information comprising error and system information;
  presenting a user dialog based on the software application state information, the user dialog comprising at least one input field;
  accepting comments regarding the software application via the user dialog; and
  transmitting a user report comprising the comments and the application state information to the pre-addressed destination.

54. The program storage device of claim 53, wherein:
  a transport connection is initiated with the destination when the reporting module is invoked; and
  the user input and the application state information is transmitted to the destination via the transport connection.

55. The program storage device of claim 54, wherein the method further comprises the steps of:

receiving the user report at the pre-determined destination; and processing the user report in accordance with the user comments and the application state information.

56. The program storage device of claim 55, wherein the user report is routed according to the user comments and application state information.

57. The program storage device of claim 55, wherein the method step of processing the user report in accordance with the user comments and application state information comprises the method step of storing the user report information in a database and the method steps further comprise the method step of compiling statistics from the database.

58. The program storage device of claim 53, wherein the user report is transmitted from a user address and the method steps further comprise the step of transmitting an acknowledgement message from the destination to the user address.

59. A program storage device, readable by computer having a processor and a memory, tangibly embodying one or more programs of instructions executable by the computer to perform the method steps of receiving context-sensitive comments in a pre-addressed destination, the method steps comprising the steps of:

receiving a user report at the pre-addressed destination, the user report comprising application context information and user comments generated via a reporting module; and processing the user report based on the user comments and context information.

60. The program storage device of claim 59, wherein the method step of processing the user report based on the user comments comprises the method step of routing the user report according to the user comments and context information.

61. The program storage device of claim 59, wherein the method step of processing the user report based on the user comments comprises the method step of performing a statistical analysis of the user reports.

62. A program storage device, readable by computer having a processor and a memory, tangibly embodying one or more programs of instructions executable by the computer to perform the method steps of reporting comments to a destination, the method steps comprising the steps of:

invoking a module in a software application;

accepting comments in an input field of a user dialog, the user dialog based upon a current context of the software application; and transmitting a user report comprising the comments and the current context to the destination.

63. The program storage device of claim 62, wherein the user report further comprises the context history of the software application.

64. A program storage device, readable by computer having a processor and a memory, tangibly embodying one or more programs of instructions executable by the computer to perform the method steps of reporting context-sensitive comments to a pre-addressed destination from an executing software application, the method steps comprising the steps of:

invoking a reporting module in the executing software application;

reading software application context information from the executing software application;

presenting a user dialog based on the software application context information, the user dialog comprising an input field;

accepting the comments via the user dialog; and transmitting a user report comprising the comments and the context information to the pre-addressed destination.

65. A method of reporting user comments to a destination, comprising the steps of: invoking a reporting module in a computer when a user selects a hotkey in a software application executing on the computer;

presenting a user report dialog pre-addressed to the destination;

accepting at least one user comment in the user report dialog; and transmitting a user report comprising the user comment to the destination.

\* \* \* \* \*

UNITED STATES PATENT AND TRADEMARK OFFICE
CERTIFICATE OF CORRECTION

PATENT NO.     : 6,381,711 B1
DATED          : April 30, 2002
INVENTOR(S)    : Alice Chiang, RamonaLisa P. Martinez and Sheila I. Sholar It is certified that error appears in the above-identified patent and that said Letters Patent is hereby corrected as shown below:

<u>Title page,</u>
Item [56], References Cited, U.S. PATENT DOCUMENTS,
5,390,281 A  2/1995 "Liciw et al" should read -- Luciw et al. --

Signed and Sealed this

Fourth Day of March, 2003

JAMES E. ROGAN
*Director of the United States Patent and Trademark Office*